United States Patent
Oklejas, Jr.

(10) Patent No.: US 10,618,006 B2
(45) Date of Patent: Apr. 14, 2020

(54) METHOD AND SYSTEM FOR INTERNAL PERMEATE PROCESSING IN REVERSE OSMOSIS MEMBRANES

(71) Applicant: Fluid Equipment Development Company, LLC, Monroe, MI (US)

(72) Inventor: Eli Oklejas, Jr., Newport, MI (US)

(73) Assignee: FLUID EQUIPMENT DEVELOPMENT COMPANY, LLC, Monroe, MI (US)

( * ) Notice: Subject to any disclaimer, the term of this patent is extended or adjusted under 35 U.S.C. 154(b) by 0 days.

(21) Appl. No.: 16/435,858

(22) Filed: Jun. 10, 2019

(65) Prior Publication Data

US 2019/0291053 A1 Sep. 26, 2019

Related U.S. Application Data

(63) Continuation-in-part of application No. 16/210,027, filed on Dec. 5, 2018.
(Continued)

(51) Int. Cl.
*B01D 61/02* (2006.01)
*B01D 61/12* (2006.01)
*C02F 1/44* (2006.01)

(52) U.S. Cl.
CPC ........... *B01D 61/025* (2013.01); *B01D 61/12* (2013.01); *B01D 2313/13* (2013.01);
(Continued)

(58) Field of Classification Search
None
See application file for complete search history.

(56) References Cited

U.S. PATENT DOCUMENTS

| | | | | |
|---|---|---|---|---|
| 4,702,842 A | * | 10/1987 | Lapierre | ................ B01D 65/08 210/651 |
| 2012/0228208 A1 | | 9/2012 | Tayalia et al. | |

FOREIGN PATENT DOCUMENTS

| | | |
|---|---|---|
| EP | 2 008 705 A1 | 12/2008 |
| JP | H11 267470 A | 10/1999 |

(Continued)

OTHER PUBLICATIONS

"Machine Translation of JP2000015064", Adachi et al., published 2000, 33 total pages. (Year: 2000).*
(Continued)

*Primary Examiner* — Jonathan M Peo
(74) *Attorney, Agent, or Firm* — Harness, Dickey & Pierce, P.L.C.

(57) ABSTRACT

A reverse osmosis system includes a multi-element membrane array having membrane elements disposed in series. Permeate pipes receive permeate from respective membrane elements. The connectors coupling the permeate pipes have a flow restrictor. The restrictors have an effective area that increases in subsequent connectors. The body has an outer wall and an orifice plug within a longitudinal passage. The orifice plug is separated from the body. Each orifice plug has a carrier body with a plug passage therethrough. Each carrier body has an orifice plate having an orifice disposed within the plug passage and a spring disposed within the carrier body resisting movement of the orifice plate, whereby movement of the orifice plate changes an amount of fluid flowing through each connector. Each spring in subsequent connectors provides a reduced amount of spring force for resisting movement of the orifice plate.

11 Claims, 12 Drawing Sheets

Related U.S. Application Data

(60) Provisional application No. 62/595,754, filed on Dec. 7, 2017.

(52) U.S. Cl.
CPC .... *B01D 2313/19* (2013.01); *B01D 2317/025* (2013.01); *C02F 1/441* (2013.01)

(56) References Cited

FOREIGN PATENT DOCUMENTS

| | | |
|---|---|---|
| JP | 2000 015064 A | 1/2000 |
| WO | WO 2014/176067 A1 | 10/2014 |

OTHER PUBLICATIONS

International Search Report for PCT application No. PCT/US2018/064254 filed on Dec. 6, 2018. Search dated Mar. 25, 2019.

* cited by examiner

METHOD AND SYSTEM FOR INTERNAL PERMEATE PROCESSING IN REVERSE OSMOSIS MEMBRANES

RELATED APPLICATION

This application is continuation-in-part of U.S. application Ser. No. 16/210,027, which is a non-provisional application of provisional application 62/595,754, filed Dec. 7, 2017, the disclosure of which is incorporated by reference herein.

TECHNICAL FIELD

The present disclosure relates generally to reverse osmosis systems, and, more specifically, to a method and system for controlling permeate production is multi-element membrane arrays.

BACKGROUND

The statements in this section merely provide background information related to the present disclosure and may not constitute prior art.

Reverse osmosis systems typically use one or more membrane housings that have one or more membranes therein that are used to extract an essentially pure fluid from a solution. The desalination reverse osmosis membranes receive feed fluid from brackish or sea water and extract fresh water therefrom. Fresh water is extracted or separated when the pressure of the feed fluid exceeds the osmotic pressure of the fluid which allows permeate or product fluid to cross the semi-permeable reverse osmosis membrane. The fluid that is left on the input side to the membrane becomes higher in salt concentration because fresh water that travels through the membrane does not include the salt. The water that passes through the membrane is referred to as permeate. The pressure required to produce fresh water is proportional to the concentration of the total dissolved solids (TDS) in the feed solution within the reverse osmosis housing. For typical ocean water, the concentration is about 35,000 parts per million (ppm) and the corresponding osmotic pressure is about 450 pounds per square inch (psi) (3,102 kPa). For 70,000 ppm feed fluid, the osmotic pressure approximately doubles to 900 psi (about 6,205 kPa). A typical seawater reverse osmosis system uses a series of membranes that recover up to about 45% of the fresh water and generate about 55% concentrate brine from the original volume of seawater. The net driving pressure (NDP) equals the feed pressure minus the osmotic pressure minus the permeate pressure. The net driving pressure is the pressure energy available to drive pure fluid across the membrane.

Referring now to FIG. 1A, a reverse osmosis system 10 according to the prior art includes a membrane array 12 that generates a permeate stream through permeate pipe 14 and a brine stream through a brine pipe 16 from a feed stream in a feed pipe 18. The feed stream originates from a source 19 typically includes brackish or sea water. A feed pump 20 coupled to a motor 22 pressurizes the feed stream to a required pressure, and the feed stream enters the membrane array 12 at the required pressure.

The membrane array 12 includes a membrane housing or pressure vessel 24 and a membrane 26. The portion of the feed stream that flows through the membrane 26 before exiting the membrane array 12 forms the permeate stream that exits through the permeate pipe 14. The portion of the feed stream that does not flow through the membrane 26 before exiting the membrane array 12 forms the brine stream that exits in the brine pipe 16.

The permeate stream in the permeate pipe 14 is a purified fluid flow at a low pressure that collects in a tank 28 or is piped to a desired location. The brine stream is a higher pressure stream that contains dissolved materials blocked by the membrane 26. The pressure of the brine stream is only slightly lower than the feed stream. A control valve 30 may be used to regulate the flow through and pressure in the membrane array 12. The brine stream may flow through the control valve 30 and into a drain or tank 32.

Referring now to FIG. 1B, the membrane 26 of FIG. 1A is typically formed of a plurality of elements 40. The elements 40 are typically formed in a cylindrical shape by rolling a plurality of sheets and spacers together. In this example a first sheet 42 and a second sheet 44 are glued together on three sides with the fourth side being in glued communication with the central collection tube 46 communicating permeate to a desired location as indicated by arrow 48. Brine which may also be referred to as reject 50 does not enter the collection tube 46. The sheets and the spacers 52 are glued between the membrane sheets 42 and 44 to allow the sheet 44 to stay slightly apart and allow permeate to flow to the collection tube 46. A second spacer sheet 54 is used to keep the membrane sheets slightly apart and allow the axial flow through the element and allow brine or reject 50 to flow therethrough.

Referring now to FIG. 1C, a membrane channel 56 is used to deliver the feed fluid. The membrane sheets 42 and 44 are illustrated. The membrane channel 56 has an inlet 56A and an outlet 56B through which the feed fluid progresses. As the feed fluid progresses through the membrane channel 56, the concentration of dissolved solid increases. This is represented by the permeate 58. Permeate production is much higher at the inlet 56A of the membrane channel 56 and decreases over the length of the membrane channel 56 toward the outlet 56B. Along the length of the membrane channel 56 the total dissolved solids (TDS) increases and thus the higher osmotic pressure and a reduction in feed pressure is present over the length of the membrane channel 56. A reduction in the net driving pressure (NDP) is also present as the permeate is extracted down the length of the permeate channel 56.

Referring now to FIG. 1D, a chart illustrating the relationships of various membrane parameters for a reverse osmosis system with about forty-five percent recovery in the handling of sea water is set forth. In this example the feed pressure is about 860 psi (5929 kPa) and loses about 10 psi (68.95 kPa) over the channel length. The osmotic pressure is about 450 psi (3103 kPa) and rises to about 820 psi (5654 kPa) due to the increasing total dissolved solids of the feed. The feed total dissolved solids (TDS) starts at about 35,000 ppm and raises to 63,000 ppm at the end of the membrane channel 56 illustrated in FIG. 1C. The net driving pressure (NDP) starts about 500 psi (3447 kPa) and decreases to about 50 psi (345 kPa). The permeate flow rate decreases to a negligible amount at the end of the membrane channel 56.

Referring now to FIG. 1E, an inlet pipe 60 fluidically communicates fluid into the pressure vessel 24. A flow distributor 62 distributes fluid to the reverse osmosis elements 40A-40E in-series rather than around the elements 40A-40E. The flow distributor 62 spreads the fluid flow radially across the surface of element 40A. The seal 64 allows fluid from the flow distributor 62 to not circumvent the first element 40A. The flow continues through the elements 40A-40E sequentially. Permeate exit collection tubes 46A, 46B, 46C, 46D and 46E receive the permeate from each respective element 40A-40E. Connectors 66A-66D join successive permeate exit collection tubes 46A-46E. An anti-telescoping device 68 may be used to maintain the position of the elements 40A-40E relative to the flow distributor 62. In most applications between three and eight elements are used. Five of which are used in this example. A brine exit pipe 70 is used to emit the brine from the pressure vessel 24. Permeate exit collection tube 46 flows in a direction indicated by the arrow 48.

As the feed progresses from element to element, the amount of total dissolved solids (TDS) increases until the brine exits the brine exit pipe 70. The osmotic pressure is mostly determined by the concentration of the total dissolved solids. Each succeeding element experiences a higher concentration and thus higher osmotic pressure and lower Net Driving Pressure than the preceding element. Consequently, each successful element has lower permeate production than the preceding element. A minimum Net Driving Pressure for sea water in an RO system is about 100 psi (689.5 kPa). An initial feed pressure must be substantially higher than the initial osmotic pressure to ensure sufficient Net Driving Pressure available toward the end of the array. A typical pressure may be about 800 psi (5516 kPa) while the osmotic pressure is about 450 psi (3103 kPa) which yields a Net Driving Pressure of 350 psi (2413 kPa) for the first element. At the end of the array the osmotic pressure may be 700 psi (4826 kPa) which reduces the Net Driving Pressure to 100 psi (689.5 kPa). A high initial Net Driving Pressure is wasteful because the pressure is much higher than needed for an optimal rate of permeate production. In an ideal situation, the feed pressure would steadily increase to compensate for the increasing osmotic pressure resulting in a constant net driving pressure throughout the array.

A valve 72 is set to increase permeate pressure to reduce flux in the element to an acceptable value. The higher permeate pressure reduces differential pressure and thus is reduced and fouling is reduced. However, this causes other membranes to have reduced NDP and thus low productivity. This may result in a final membrane producing little or no permeate.

Another issue with reverse osmosis systems is polarization. Polarization is the formation of a stagnant boundary layer adjacent to the membrane surface where the concentration of salinity and foulant becomes very high. Polarization occurs when the flow velocity through the membrane elements is reduced to a certain value. Polarization typically becomes severe when flow velocity drops to below fifty percent relative to the inlet flow velocity of the first element. The typical amount of permeate that can be recovered is about fifty percent or lower and may have a typical range between thirty-eight and forty-five percent.

Referring now to FIG. 2A, one way in which to achieve higher permeate recovery is employing a first set of pressure vessels 210A, 210B which feed a second set of pressure vessels 210C. In this example, two pressure vessels are illustrated in a first stage 212 and a single pressure vessel is illustrated in a second stage 214. This type of configuration is referred to as a 2:1 array. Feed fluid enters a feed manifold 220 which is distributed between the pressure vessels 210A and 210B. The brine exits the pressure vessels 210A and 210B through a brine manifold 224 to pressure vessel 210C in the second stage 214. Permeate exits the pressure vessels 210A and 210B through a permeate manifold 228. The permeate manifold 228 is also in communication with the permeate generated in the pressure vessel 210C. The higher concentrated brine is removed from the pressure vessel 210C through a brine pipe 230. Of course, other types of array configurations are known such as a 3:2 and 4:3. For three-stage systems 6:4:2 configurations have been used. Two-stage systems have permeate recovery of about fifty percent to seventy-five percent. Three stage systems may also recover up to about eighty-five percent of permeate.

A valve 232 is set to increase permeate pressure sufficiently to reduce the flux in the first element to an acceptable level. Elements in the second stage operate with normal permeate pressure and thus maximum NDP is available.

A second example of a two-stage system is illustrated in FIG. 2B. In this example, a boost pump 240 is used between the two stages. That is, the boost pump 240 is in communication with the brine manifold 224 and boosts the pressure in the brine manifold 224 to a desirable pressure to compensate the losses in the Net Driving Pressure that occur within the pressure vessels 210A and 210B of the first stage 212. Energy recovery devices such as turbochargers are known to be used in reverse osmosis systems to recover the hydraulic energy in a brine stream that exit the last stage and boosts the pressure of another stream such as the feed stream.

SUMMARY

The present disclosure provides a method and system for a reverse osmosis system that includes a multi-element membrane array having a plurality of membrane elements disposed in series and a plurality of permeate pipes receiving permeate from a respective one of the plurality of membrane elements. Each of the plurality of elements has an inlet and an outlet. A plurality of connectors coupling successive permeate pipes together. Each of the plurality of connectors includes one of a plurality of flow restrictors. Each of the plurality of flow restrictors is sized to further restrict permeate flow into a subsequent permeate pipe of the plurality of permeate pipes.

In a further aspect of the disclosure, a method of operating series connected membranes includes providing connectors between adjacent permeate pipes of adjacent membranes having one of a plurality of flow restrictors, each of the plurality of flow restrictors sized to further restrict permeate flow into a subsequent permeate pipe, reducing pressure with each of the flow restrictors, and reducing permeate pressure at subsequent membranes to maintain a substantially equal net driving pressure at subsequent membranes.

In yet another aspect of the disclosure, a reverse osmosis system includes a multi-element membrane array having a plurality of membrane elements disposed in series. A plurality of permeate pipes receives permeate from a respective one of the plurality of membrane elements. Each of the plurality of membrane elements has an inlet and an outlet. A plurality of connectors couples successive permeate pipes together. Each of the plurality of connectors comprises one of a plurality of flow restrictors. Each of the plurality of flow restrictors are sized to restrict permeate flow into a subsequent permeate pipe of the plurality of permeate pipes, an effective area that fluid flows through increases in subsequent connectors. Each connector of the plurality of connectors has a body having a connector inner wall defining a longitudinal passage therethrough. The body has an outer wall and an orifice plug within the longitudinal passage. The orifice plug separates from the body. Each orifice plug has a carrier body have a plug passage therethrough. Each carrier body has an orifice plate comprising an orifice disposed within the plug passage and a spring disposed within the carrier body resisting movement of the orifice plate, whereby movement of the orifice plate changes an amount of fluid flowing through each connector. Each spring in subsequent connectors provides a reduced amount of spring force for resisting movement of the orifice plate.

In yet another aspect of the disclosure, A reverse osmosis system includes a multi-element membrane array having a plurality of membrane elements disposed in series. A plurality of permeate pipes receives permeate from a respective one of the plurality of membrane elements. Each of the plurality of membrane elements has an inlet and an outlet. A plurality of connectors couples successive permeate pipes together. Each of the plurality of connectors comprises one of a plurality of flow restrictors. Each of the plurality of flow restrictors are sized to restrict permeate flow into a subsequent permeate pipe of the plurality of permeate pipes, an area that fluid flows through increases in subsequent connectors. Each connector of the plurality of connectors has a body having a connector inner wall defining a longitudinal passage therethrough. The body has an outer wall, an orifice plug within the longitudinal passage. The orifice plug separates from the body. Each orifice plug has a carrier body have a plug passage therethrough. Each carrier body has an orifice plate comprising an orifice disposed within the plug passage, a spring disposed within the carrier body resists movement of the orifice plate and flow restrictor at least partially received within the orifice, whereby the flow restrictor comprises a contoured surface such that each subsequent orifice and flow restrictor combination changes an amount of fluid flowing through each connector.

Further areas of applicability will become apparent from the description provided herein. It should be understood that the description and specific examples are intended for purposes of illustration only and are not intended to limit the scope of the present disclosure.

DETAILED DESCRIPTION

Figure 1A:
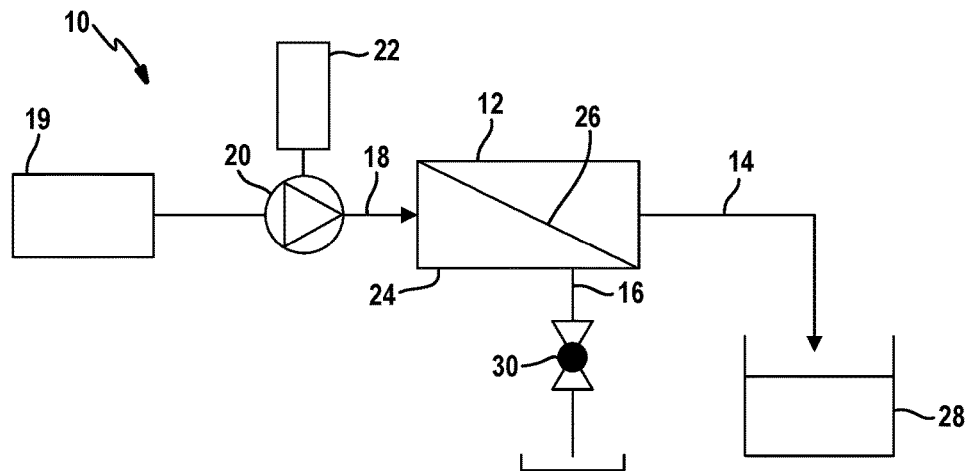
FIG. 1A is a schematic view of a prior art reverse osmosis system.
Figure 1B:
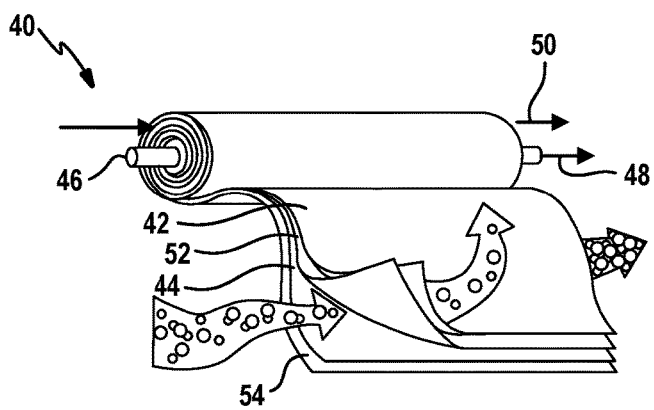
FIG. 1B is a perspective view of a permeate membrane showing the layers therein of the prior art.
Figure 1C:
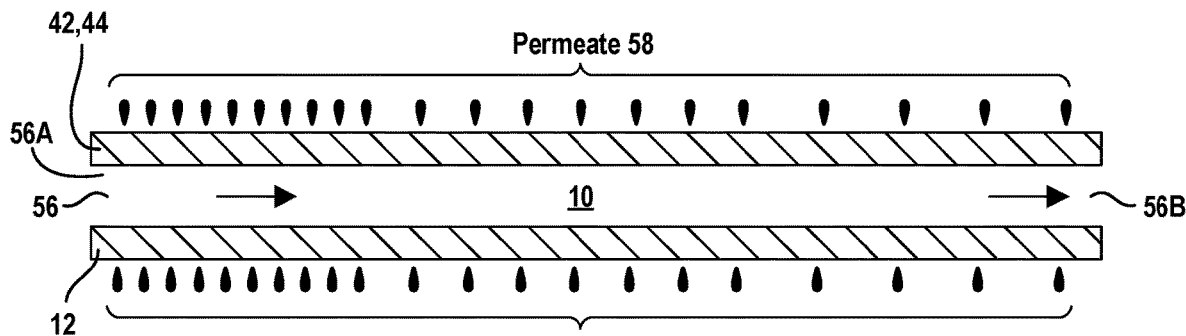
FIG. 1C is a representative view of a membrane channel generating permeate.
Figure 1D:
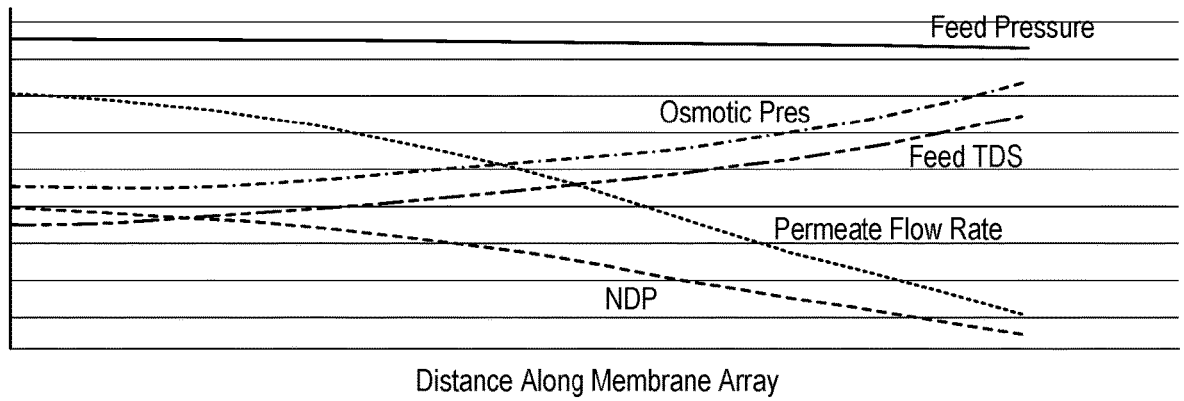
FIG. 1D is a chart illustrating feed pressure, osmotic pressure, the feed total dissolved solids (TDS), the permeate flow rate and net driving pressure (NDP).

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure. The word subsequent is used to denote downstream or later in the flow path. That is, subsequent connectors are connectors after or downstream from a particular connector.

Figure 2A:
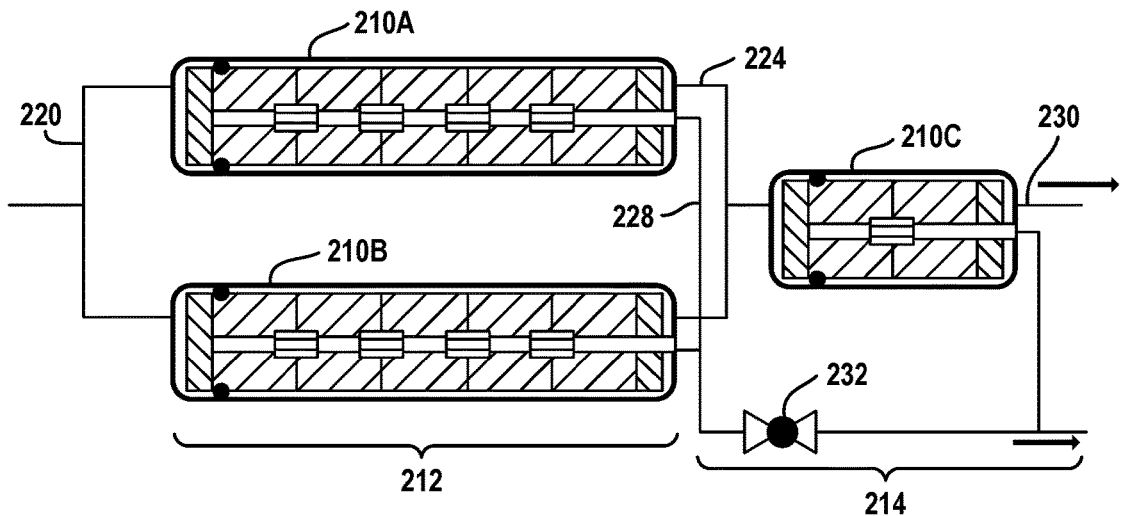
FIG. 2A is a block diagrammatic view of a multistage multi-element pressure vessel configuration of the prior art.
Figure 2B:
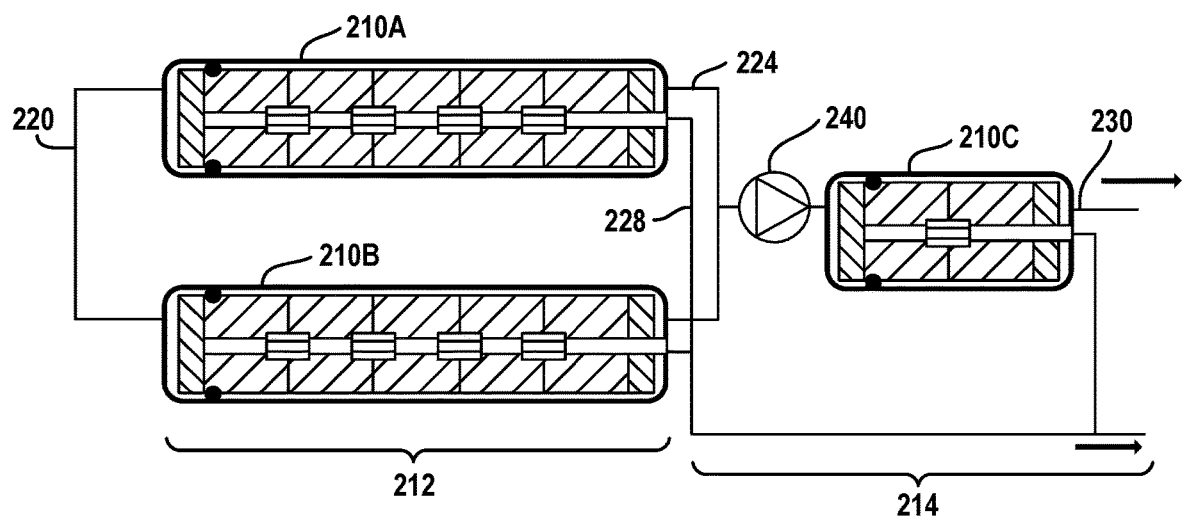
FIG. 2B is a schematic view of a multi-element pressure vessel according to the prior art.

The present system is illustrated to a single pressure vessel. However, the following examples may be included in systems with multiple pressure vessels such as those set forth in the description of FIG. 2A and FIG. 2B.

Figure 1E:
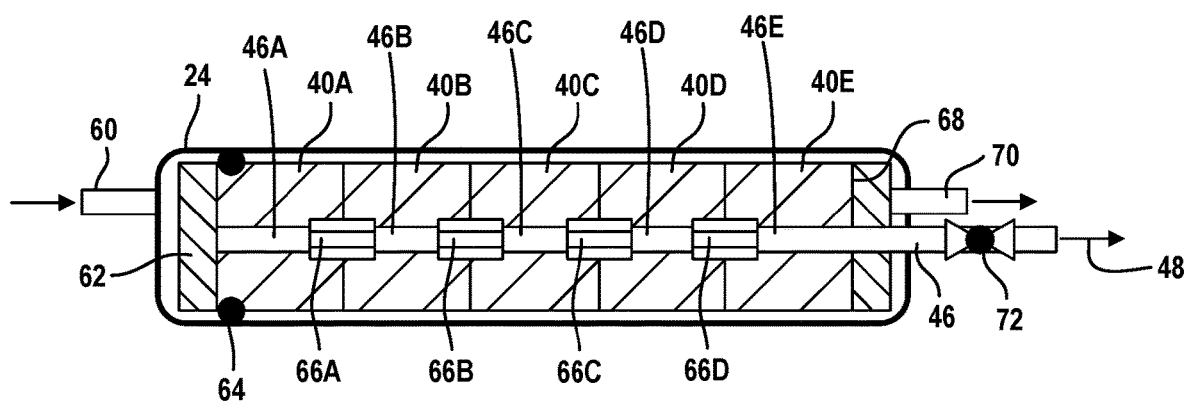
FIG. 1E is a cutaway view of a pressure vessel having a plurality of membrane elements of the prior art.
Figure 3:
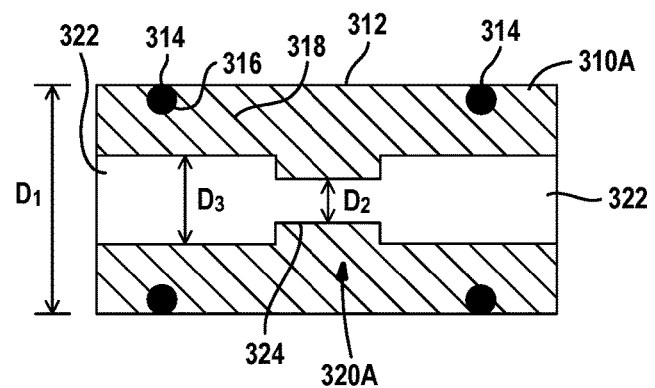
FIG. 3 is a cross-sectional view of a first example of a connector used for flow restriction.

Referring now to FIG. 3, the present disclosure provides the connector 310A as a replacement for the connectors 66A-66D illustrated in FIG. 1E set forth above. The connector 310A has a connector body 312 formed by a connector wall 318 that has an external diameter $D_1$. To prevent fluid loss between the permeate pipe and the connector body 312, one or more seals 314 such as O-rings may be incorporated into an external channel 316 on the outside of the connector body 312.

The connectors 310A are used to connect successive permeate collection tubes 46A-46E together as set forth in FIG. 4 below. Each of the connectors has a flow restrictor 320 that allows each element in the pressure vessel to operate at an optimal flux rate by individual control of the permeate pressure in each element. The NDP for each element should be the same to achieve an approximately equal permeate production form every element. This is done by having very high permeate pressure in the first element to compensate for the low osmotic pressure and then have progressively lower permeate pressure in the following elements to compensate for increasing osmotic pressure. The orifice diameter increases for each element downstream in the housing to reduce permeate pressure. The pressure distribution is therefore exactly opposite to that of a conventional array of membranes. The flow restrictor 320A has an effective diameter $D_2$ which is less than the diameter $D_3$ of the connector passage 322. The connector wall 318 has a thicker portion that extends inward to form the orifice 324 the effective diameter $D_2$ corresponds to the effective area that the fluid flows through to create the desired pressure drop. The orifice diameter of the effective diameter $D_2$ increases in each subsequent connector. Thus the effective area of fluid flow increases in subsequent connectors. In this example the flow restrictor 320A comprises an orifice 324 that has the reduced diameter $D_2$ compared to that of the connector passage 322. The orifice 324 creates a pressure drop in the permeate that flows therethrough. Pressure upstream of the orifice 324 is higher than the pressure downstream of the orifice 324. The suitable diameter $D_2$ for the orifice 324 may be experimentally determined so that the permeate for production for each element is the same.

Figure 4:
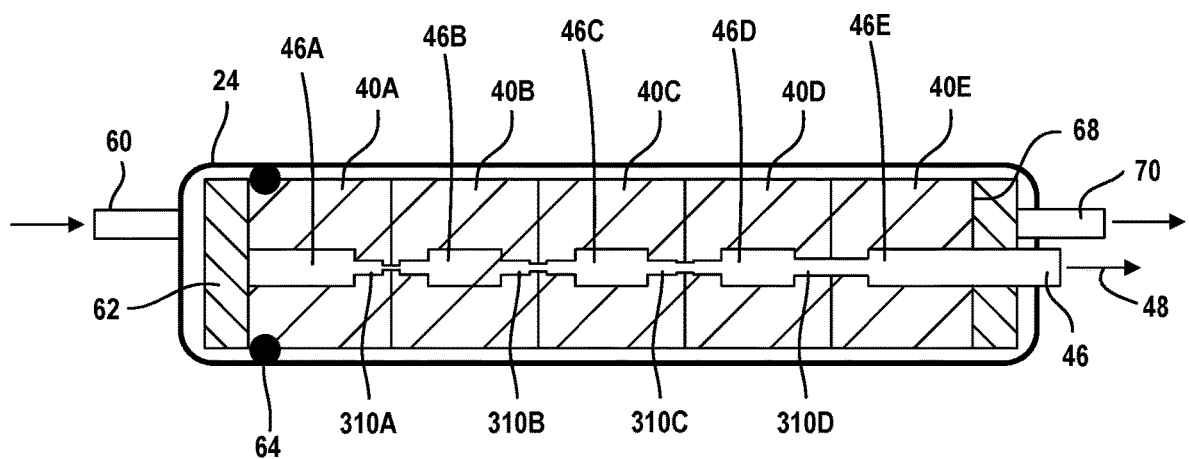
FIG. 4 is a cross-section of a multi-element array having a plurality of connectors such as that of FIG. 3.

Referring now to FIG. 4, the connectors 310A-310D may be inserted into permeate pipes disposed between successive elements 40A-40E of a five element pressure vessel 24. In this example, the same reference numerals are used for the same components illustrated in FIG. 1E with the absence of the valve 72 being removed.

The orifice 324 is relatively small and thus a great deal of flow resistance is used to raise the permeate pressure in the elements which in turn reduces the net driving pressure which reduces the rate of permeate production. The connector 310B has an increased orifice size, effective area or an increased effective diameter $D_2$ from that of connector 310A. The connector 310B accommodates the permeate flow from the elements 340A and 340B. To allow a desired permeate flow resistance so that the NDP is optimal. The orifice 324 in the connector 310C has a larger orifice size or diameter $D_2$ than both the previous connectors 310A and 310B to accommodate the preceding flow from out of the membrane elements 40A, 40B and 40C. The diameter $D_2$ of connector 310C is thus greater than the diameter of the orifices in 310A and 310B. The orifice 324 within the connector 310D also must accommodate the permeate flow from the membrane elements 340A, 340B, 340C and 340D. Thus, the diameter $D_2$ is also greater than all of the previous orifice diameters from the connectors 310A-310C. To state it in another way each successive effective diameters $D_2$ in subsequent connectors increases.

Figure 5:
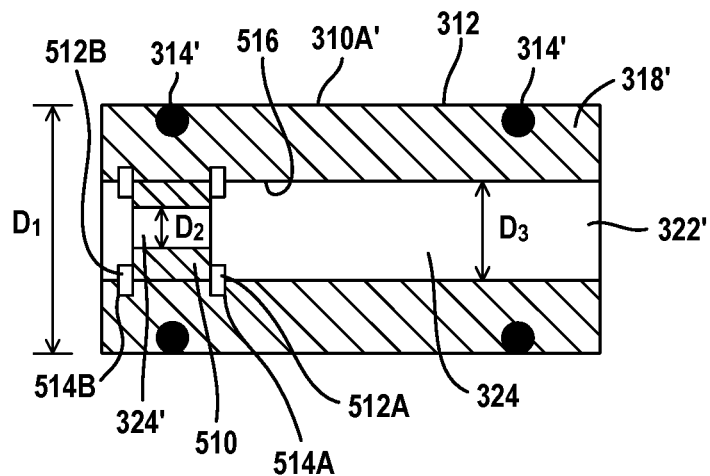
FIG. 5 is a second example of a connector according to the present disclosure.

Referring now to FIG. 5, a second example of a connector 310A' is set forth. The connector 310A' in this example the diameter of the passage 322' is consistent all the way through the housing. That is, the connector wall 318' has a uniform thickness which is defined by the diameter $D_3$ of the connector body 312'. In the example set forth in FIG. 3, the orifice 324' has a fixed diameter $D_2$ for each of the connector bodies. The diameter $D_2$ increases in successive (or downstream) connectors. In this example a common connector 310A' may be set forth while an interchangeable orifice plug 510 is used to change the effective diameter $D_2$ of the orifice 324'. That is, for each of the successive connectors only the orifice plug 510 may be required to be changed to implement the different sizes. Therefore, the connectors themselves do not have to be replaced, only the orifice plugs 510.

The orifice plugs 510 may be held in place by a pair of snap rings 512A and 512B. The snap rings 512A and 512B may be received within respective axial slots 514A and 514B formed within the passage 322'. That is, the axial slots 514A and 514B may be formed within an inner wall 516 of the connector body 312A.

The outer diameter of the orifice plug 310 corresponds substantially to the outer diameter $D_3$ of the inner wall 516. Of course, seals (not illustrated for convenience) similar to those of the seals of 314' may be used to seal the orifice plug 510 to the inner surface 516 of the connector wall 318'. However, the snap rings 512A, 5128 may also act as a seal.

In operation, the first snap ring 512A is inserted within the axial slot 514A. Then, the orifice plug 510 is axially placed within the connector passage 322'. The second snap ring 512B is placed within the axial slot 514B to secure the orifice plug 510 into position. Each subsequent orifice plug 510 in a system may be increased in the inner diameter $D_2'$ in the downstream direction. That is, each subsequent orifice plug 510 may have a greater orifice diameter in the downstream direction.

Figure 6:
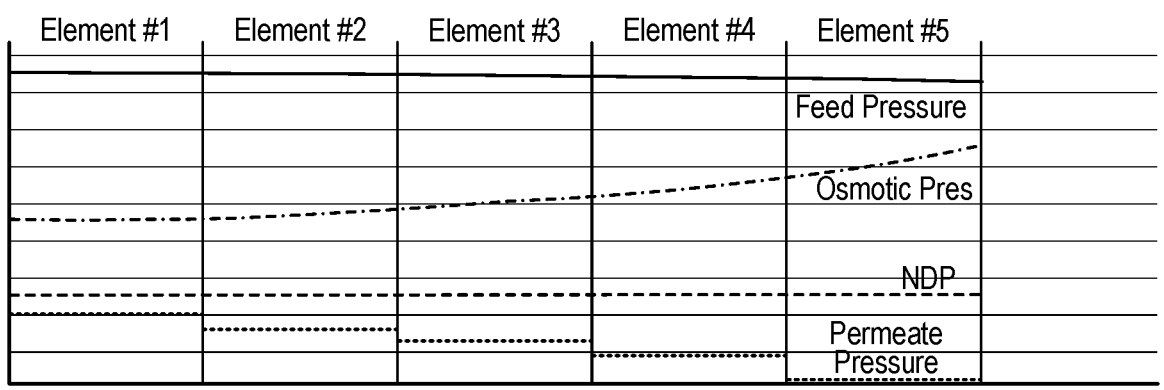
FIG. 6 is a chart illustrating the output of a membrane array having a plurality of connectors formed according to FIG. 3 or 5.

Referring now to FIG. 6, a plot of the various pressures for a five element membrane array such as that set forth in FIG. 4 is illustrated. In this example, each element has a lower permeate pressure than the preceding element to compensate for the increasing osmotic pressure. The result is that the net driving pressure remains relatively constant through the length of the membrane array. Thus, the permeate flux rate and thus the permeate production for each of the elements is relatively or substantially uniform.

Figure 7A:
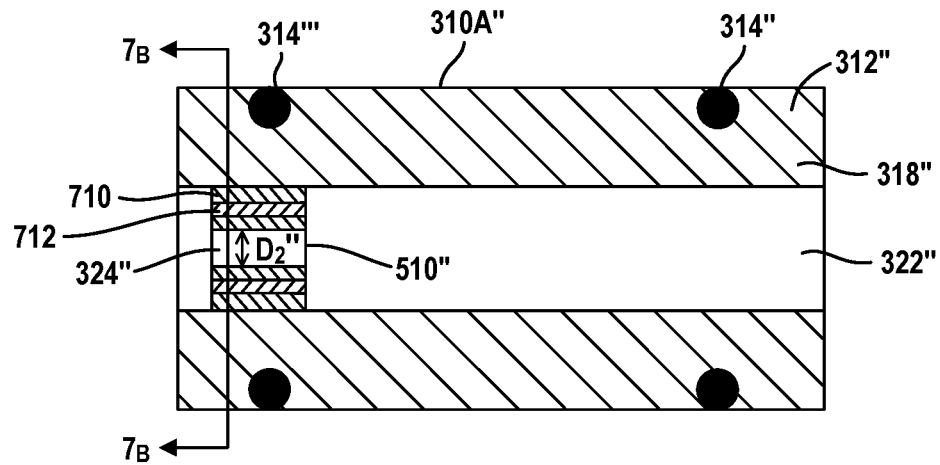
FIG. 7A is a cross-sectional view of a third example of a connector.
Figure 7B:
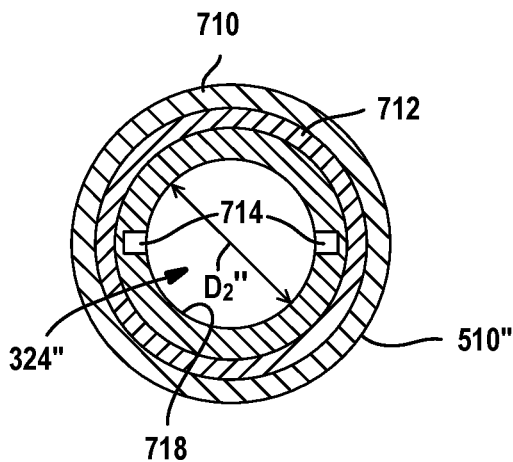
FIG. 7B is a cross-sectional view of the connector of FIG. 7A.
Figure 7C:
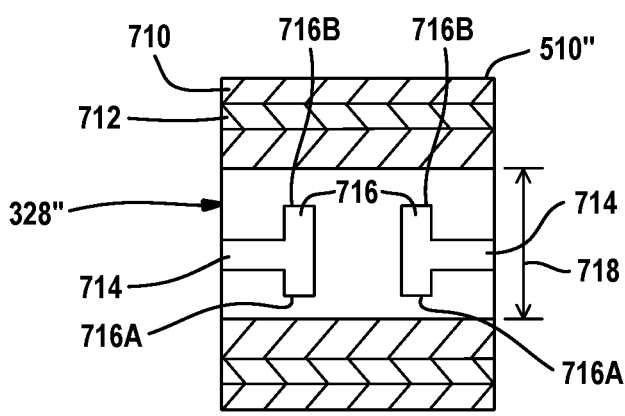
FIG. 7C is a cutaway view of the connector of FIG. 7A.

Referring now to FIGS. 7A-7C, a connector 310A" is set forth. In this example the connector 310A" includes the connector body 312" having a connector wall 318". The connector passage 322" includes an orifice plug 510" inserted therein. In this example threads are used to secure the orifice plug 510" to the connector wall 318". The orifice plug 510" is a flow restrictor. That is, the connector wall 318" has threads 710 that engage threads 712 on the orifice plug 510". As is best shown in FIG. 7B, the orifice plug 510" has threads 712 while the connector wall 318" has threads 710.

The orifice 324" has an inner diameter $D_2"$ that changes upon the position of the connector within the membrane array as described above.

Referring now specifically to FIGS. 7B and 7C, the threaded orifice plug 510" is illustrated having axial slots 714 which may be provided on both ends of the orifice plug 510". The axial slots 714 and the circumferential grooves 716 are formed on the inner surface of the orifice plug 510". This allows the threads 710 on the connector wall to engage the threads 712 on the orifice plug.

The threads 710, 712, when engaged, are used to hold the orifice plug 510" in place. The threads 710, 712 therefore do not have to be locked or otherwise retained, although thread sealant may be used. The fluid pressure flowing through the orifice plug 510" may be used to retain the orifice plug 510" in place.

Figure 8A:
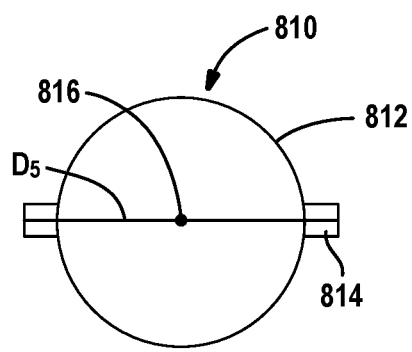
FIGS. 8A and 8B are front and side views of a rod used for inserting and removing the connector of FIG. 7A-7C.
Figure 8B:
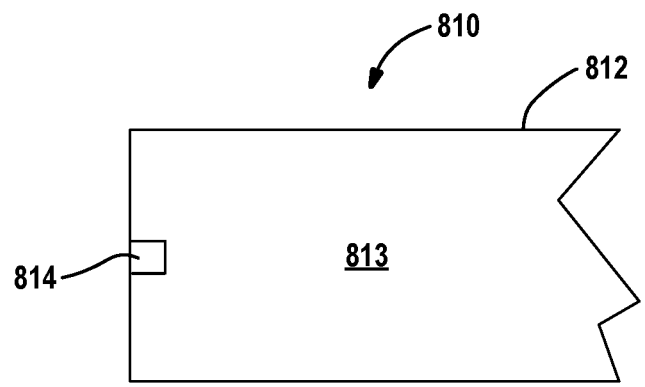

Referring now to FIGS. 8A and 8B, an insertion tool 810 is illustrated having a rod 812 that has tabs 814 extending therefrom. The tab 814 extends a greater diameter from the surface of the rod 812. In this example two tabs 814 are formed at opposite ends of the cylindrical rod surface 813. The tabs 814 are linearly disposed across the center point 816 of the rod 812. The rod 812 has a diameter $D_5$ that is sized to be received within the passage 718 that defines the orifice 324". The tabs 814 extend a distance that corresponds to the depths of the axial slots 714 and the circumferential groove 716. The rod 812 is long enough to reach into the connector passage 322" so that the orifice plug 510" may be inserted and removed.

In operation, the rod 812 is aligned so that the tabs 814 correspond to the axial slots 714. The tabs 814 are inserted into the axial slots 714 in an axial direction until they meet the circumferential grooves 716. The rod 812 is then rotated so that the tabs 814 engage and walls 716A or 716B of the circumferential groove 716. The rod 812 is rotated so that the interchangeable orifice plug 510" is also rotated so that ultimately moved in an axial direction into the connector passage 322".

Figure 9A:
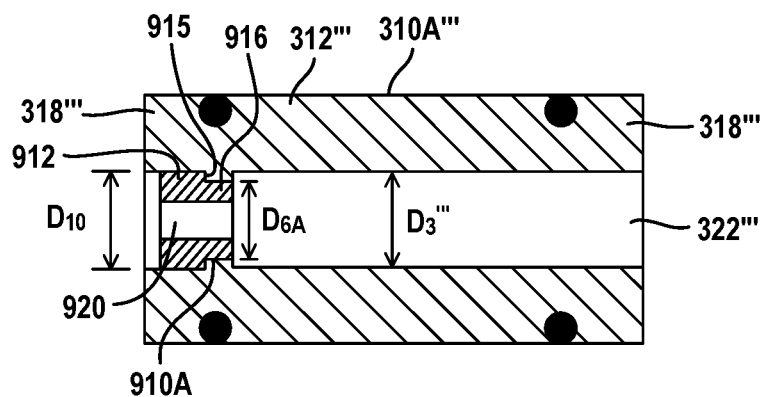
FIGS. 9A and 9B are a fourth example of a connector of the present disclosure.
Figure 9B:
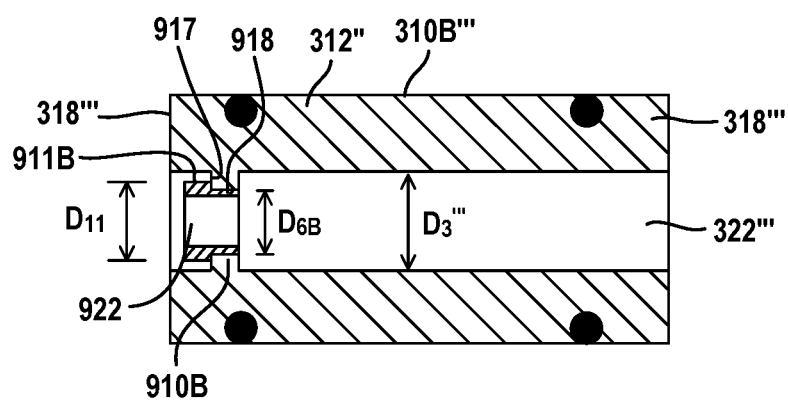

Referring now to FIGS. 9A and 9B, two connectors 310A''' and 3106''' are illustrated. In this example, the connectors 310A''' and 310B''' have a connector body 312''' that have connector wall 318'''. The connector walls 318''' include shoulders 910A and 910B that extend in an axial direction inward from the wall 318'''. The space left between the shoulders is a diameter $D_{6A}$ and $D_{6B}$. The diameter $D_{6A}$ is greater than the $D_{6B}$ to allow the orifice plug 914 to pass therethrough. The orifice plugs 912 and 914 have first portions 911A, 911B having respective maximum outer diameter $D_{10}$ and $D_{11}$. Each of the orifice plugs 912 and 914 have a seat 916 and 918 that rest against the shoulders 910A and 910B respectively. The second diameter portions or seats 916 and 918 have a smaller diameter than the diameter $D_{10}$ and $D_{11}$. Walls 915, 917 extend in an axial direction and connect the first portions 911A, 911B to seats 916, 918. It should also be noted that the shoulders may engage threads disposed on the seats 916 and 918 in a similar manner to that described above with respect FIGS. 7A-7C. That is, threads on the seats 916, 918 may engage threads on the shoulders 910A, 910B. The rod 812 with tabs 814 (of FIGS. 8A, 8B) that engage axial slots 714 and circumferential grooves 716 may also be provided in the orifice plugs 912 and 914. The difference in the diameters of the orifice plugs 912 and 914 are such that the diameter $D_{11}$ is the maximum diameter on the orifice plug 914 and thus the diameter $D_{6A}$ is greater than the diameter $D_{11}$ so that the diameter $D_{11}$ of the plug 914 can pass through the shoulders. Subsequent or downstream connectors are designed in a similar manner. This allows the connectors to be removed with rods of various lengths and diameters from all of the connectors between the membrane housings. Over time and over different conditions different size orifices 920 and 922 may be provided. Thus, the outer diameters of successive plugs continue to decrease while the inner diameters of the orifices 920 and 922 continue to increase downstream. Again, the fluid pressure through the orifices 920 and 922 which causes pressure against the orifice plugs 912 and 914 allow the orifice plugs to maintain their position. Different size diameter rods are used to remove the different connector plugs. That is, each rod has a corresponding diameter and thus the tab diameter also is changed.

Figure 10:
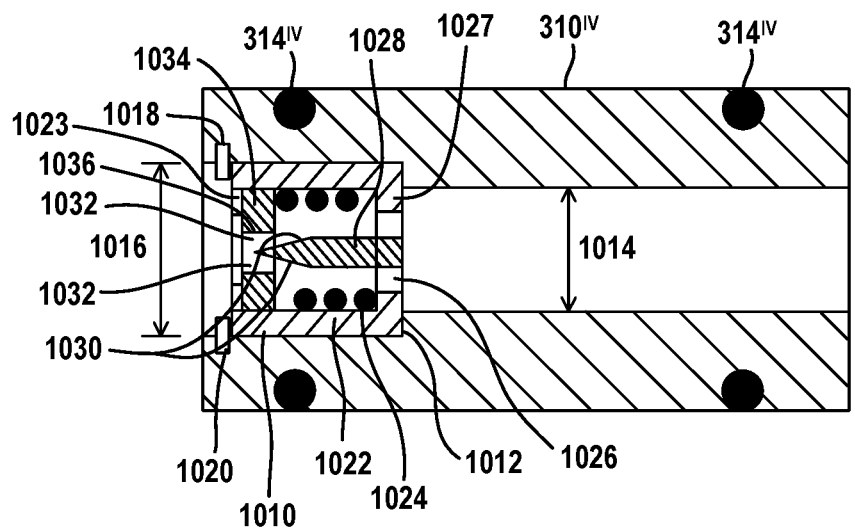
FIG. 10 is a cross-sectional view of a fifth example of a connector.

Referring now to FIG. 10, a connector 310A$^{iv}$ is set forth. In this example the seals 314$^{iv}$ may be used in a similar manner as the seals described above. In this example an active orifice plug 1010 is seated against shoulder 1012. The shoulder 1012 is formed by a diameter 1014 which is less than the diameter 1016. An axial groove 1018 receives a snap ring 1020 for holding the active orifice plug 1010 against the shoulder 1012.

The active orifice plug 1010 has a housing 1022 which, in this example is three-sided. The active orifice plug 1010 is a flow restrictor. A partial fourth side 1023 may be used to retain components within the housing 1022. The housing 1022 receives a spring 1024 that axially compresses relative to the axial passage through the connector 310A$^{iv}$. The active orifice plug 1010 also includes a port 1026 in an end wall 1027. The port 1026 is sized to allow fluid flow though the plug 1010. The port 1027 may be one or openings through the end wall 1027. The housing 1022 and, in particular, the end wall 1027 has an elongated flow restrictor 1028 coupled thereto. The flow restrictor 1028 may have angled portions 1030 that reduce the overall diameter of the flow restrictor toward the inlet 1032 of the housing 1022 the outlet of the housing 1022 is the port 1026.

The spring 1024 rests against an orifice plate 1034 the end wall 1027. The orifice plate 1034 has an orifice 1036 at the inlet 1032. Fluid flows through the housing 1022 through orifice 1036 and port 1026. The orifice plate 1034 moves in an axial direction relative to the flow and thus reacts to the differential pressure across the connector 310$^{iv}$. When the pressure is high enough the spring 1024 compresses in an axial direction as forced by the orifice plate 1034. A higher pressure of the fluid received in the connector 310$^{iv}$ causes more deflection in the orifice plate 1034 in the direction of the end wall 1027. However, the angled portions 1030 of the flow restrictor 1028 restrict the flow variably through the orifice 1036 depending on the position of the orifice plate 1034. Flow resistance thus increases through the active orifice plug 1010. This further limits the increase in flow. Conversely, if the flow rate decreases the spring 1024 pushes the orifice plate 1034 toward the inlet 1032 (left in the figure) of the connector 310$^{iv}$ and thus the flow through the orifice 1036 and the port 1026 increases. Changes in pressure yield a smaller permeate flow variation with the flow control orifice versus a fixed orifice such as those set forth in the previous example.

Figure 11:
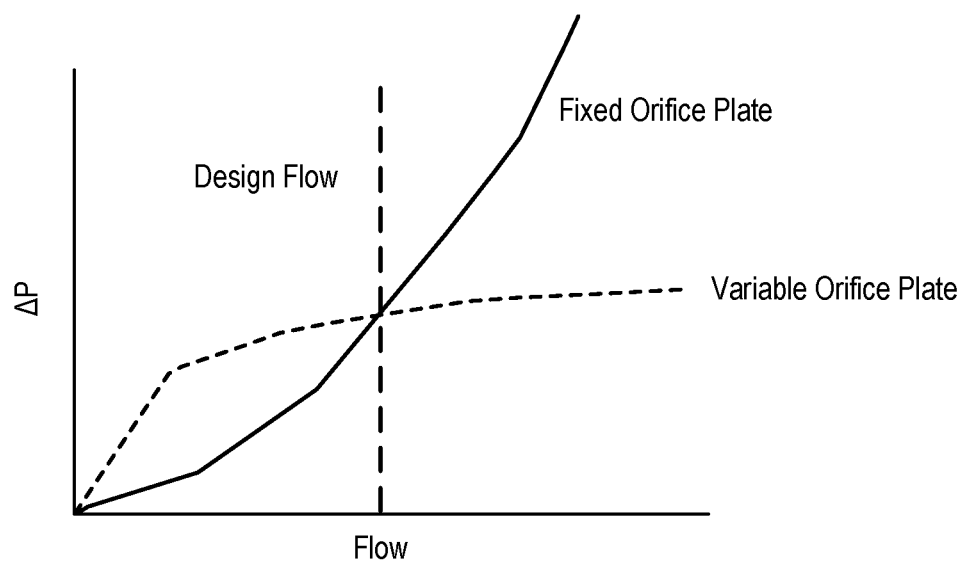
FIG. 11 is a chart illustrating orifice size for a fixed orifice or the active orifice of FIG. 10.

Referring now to FIG. 11, a chart illustrating the flow difference in flow versus a change in pressure (ΔP) characteristics of a fixed orifice plate and a flow control adjustable orifice plate is set forth. The change in pressure versus flow is set forth in the diagram of FIG. 11. Deviations in the change in pressure yields a smaller permeate flow variation with the flow control orifice versus a fixed orifice thus keeping the permeate production closer to the optimal value regardless of the feed conditions.

Figure 12:
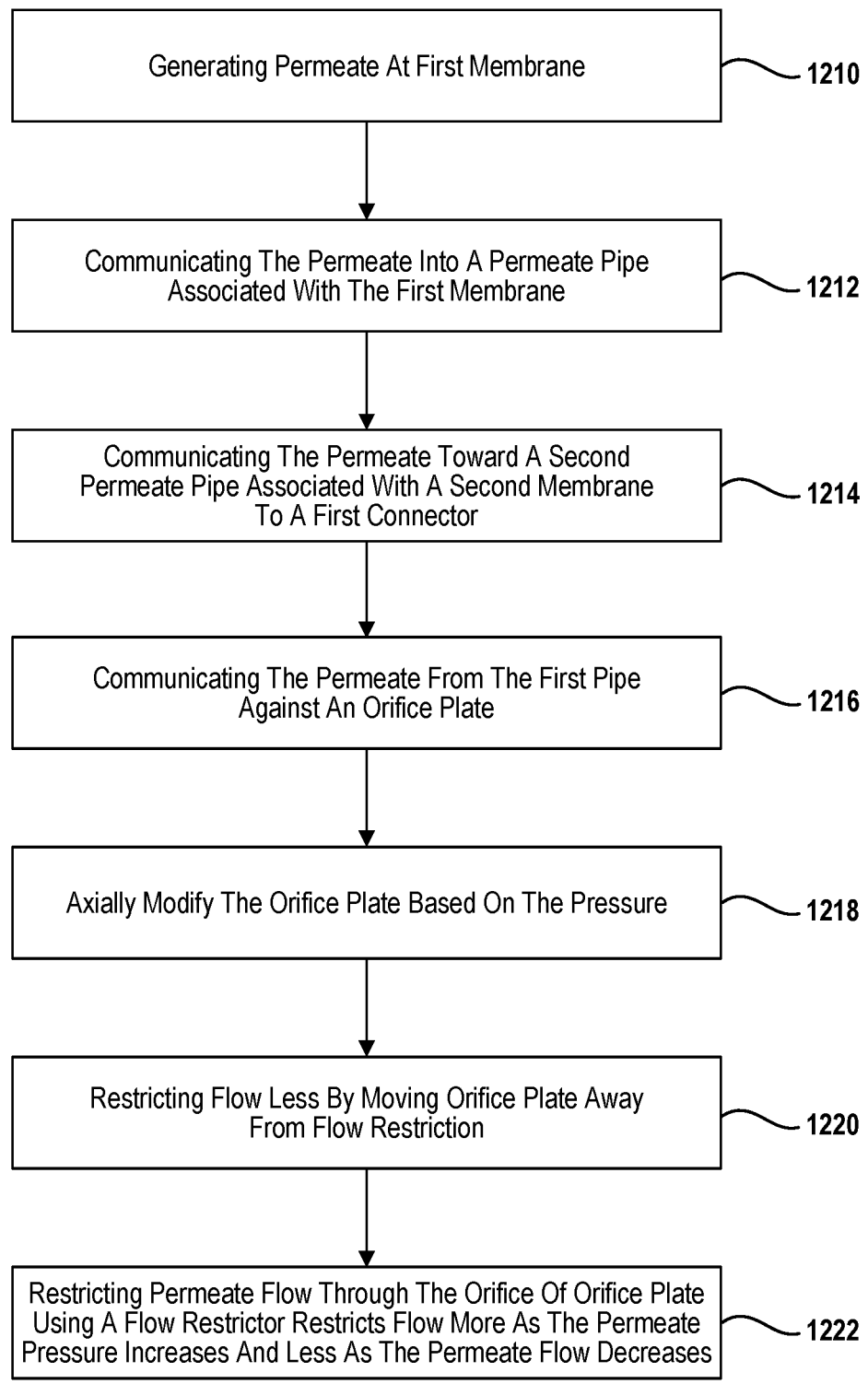
FIG. 12 is a flowchart of a method of operating the connector of FIG. 10.

Referring now to FIG. 12, a method of operating a multi-membrane permeate system is set forth. In this example permeate is generated at a first membrane in step 1212. In step 1212 permeate is communicated into a permeate pipe associated with a first membrane. In step 1214 the permeate from the first permeate pipe is communicated toward the second permeate pipe associated with a second membrane and to a first connector. In step 1216 the permeate is communicated from the first pipe against an orifice plate. In step 1218 the orifice plate is axially moved based upon the pressure of the permeate within the first permeate pipe. In step 1220, the flow is restricted by moving the orifice plate away from the flow restrictor. That is, in step 1220 the flow pressure is less than the spring force and thus the orifice plate is moved away from the restrictor to widen the amount of space available between the orifice and the flow restrictor. In step 1222 the orifice plate is pushed by the pressure of the fluid from the first permeate pipe. That is, the permeate flow is restricted through the orifice plate using the flow restrictor. As mentioned above, when the pressure of the permeate is sufficient to move the orifice plate toward the flow restrictor, the flow restrictor and the angled portions at the end of the flow restrictor restrict the flow through the orifice of the orifice plate. As more pressure is provided from the permeate more of the flow restrictor enters the orifice and the flow through the active orifice plug is reduced.

Figure 13:
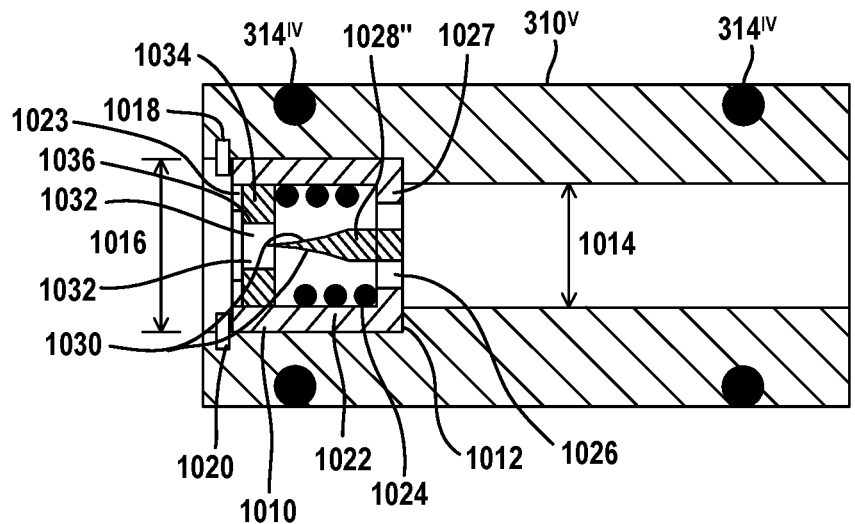
FIG. 13 is a cross-sectional view of an alternate connector.

Referring now to FIG. 13, an alternative design for a connector 310$^{iv}$ is set forth. In this example, the same reference numerals as those set forth in FIG. 10, are used for the same components. In this example, the flow restrictor 1028'', shown in more detail in FIG. 14B, is set forth having a different configuration than that set forth above with respect to FIG. 10. In FIG. 10, the flow restrictor 1028 is elongated and has a conical end surface. Also, the flow restrictor 1028, illustrated in FIG. 10, has a cylindrical portion as well.

Figure 14A:
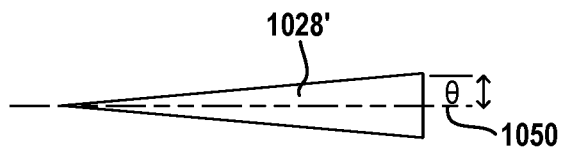
FIGS. 14A-14D are alternate configurations for a flow restrictor.
Figure 14B:
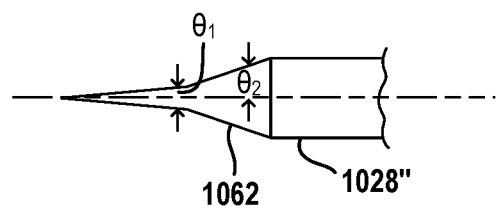

Referring now also to FIG. 14A, a first alternative design of a flow restrictor 1028' is set forth. In this example, the entire surface of the flow restrictor 1028' is cylindrical in nature. The flow restrictor 1028' has an angle Θ relative to the longitudinal axis 1050 of the connector 310$^{v}$ the angle Θ thus, the flow restrictor 1028' has a continually sloping side. Thus, the entire flow restrictor 1028' is conical.

Referring now to FIGS. 13 and 14B, the flow restrictor 1028" illustrated in FIG. 13 is provided in an enlarged manner. The flow restrictor 1028' has a first portion 1060 and a second portion 1062. The first portion 1060 has an angle $\Theta_1$ relative to the longitudinal axis 1050. The second portion 1062 has a second angle $\Theta_2$ which is larger than then first angle $\Theta_1$. The angle $\Theta_2$ provides an alternate means for control. That is, different sensitivities may be provided for variations in the flow rate through the connector 310$^v$. In this example, a relatively small displacement of the orifice may result in a large change in the flow area. Thus, the sensitivity of the system for variations in flow rate may be achieved with greater regulation.

Figure 14C:
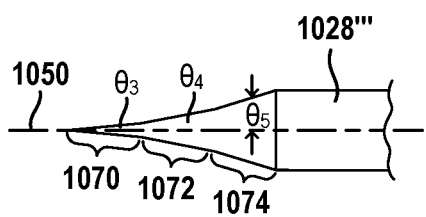

Referring now to FIG. 14C, a three contour flow restrictor 1028''' is set forth. In this example, a first portion 1070 has a first angle $\Theta_3$ relative to the longitudinal axis 1050. The second portion 1072 has a different angle $\Theta_4$ relative to the longitudinal axis 1050 and a third portion 1074 has a third angle $\Theta_5$ relative to the longitudinal axis 1050. In this example, the angle relative to the longitudinal axis 1050 increases as the distance from the inlet flow increases. As the downstream distance increases the angles of the various contours increases. That is, $\Theta_3$ is less than $\Theta_4$ which is less than $\Theta_5$. Cited another way, $\Theta_5$ is the greatest angle, $\Theta_4$ is than $\Theta_5$ and $\Theta_3$ is less than $\Theta_4$ and $\Theta_5$.

Figure 14D:
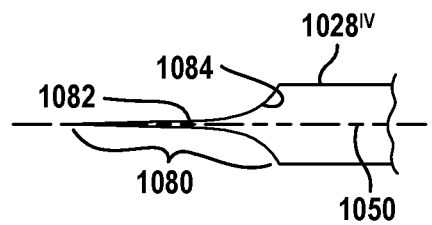

Referring now to FIG. 14D, a fourth example of a flow restrictor 1028$^{iv}$ is set forth. In this example, the end portion 1080 of the flow restrictor 1028$^{iv}$ is provided with a continually curved surface 1082. The continually curved surface 1082 provides various levels of control relative to the flow of fluid through the connectors 310$^v$. The amount of curvature of the surface 1082 may vary depending upon the requirements of the system. In this example, a tangent 1084 to the surface increases an angle relative to the longitudinal axis 1050. The angle of the tangent 1084 near the upstream end is less than the downstream end of the curved surface 1082.

Figure 15A:
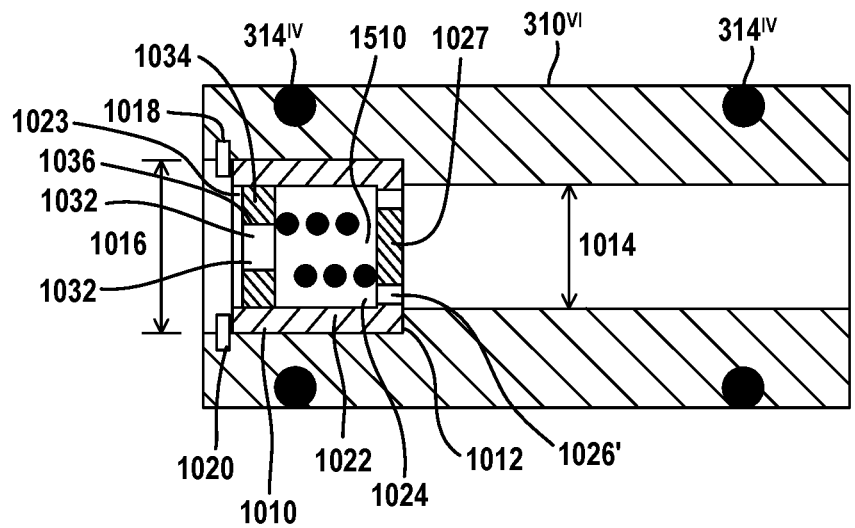
FIG. 15A is a cross-sectional view of a connector having a spring that resists fluid flow in a first unrestricted position.
Figure 15B:
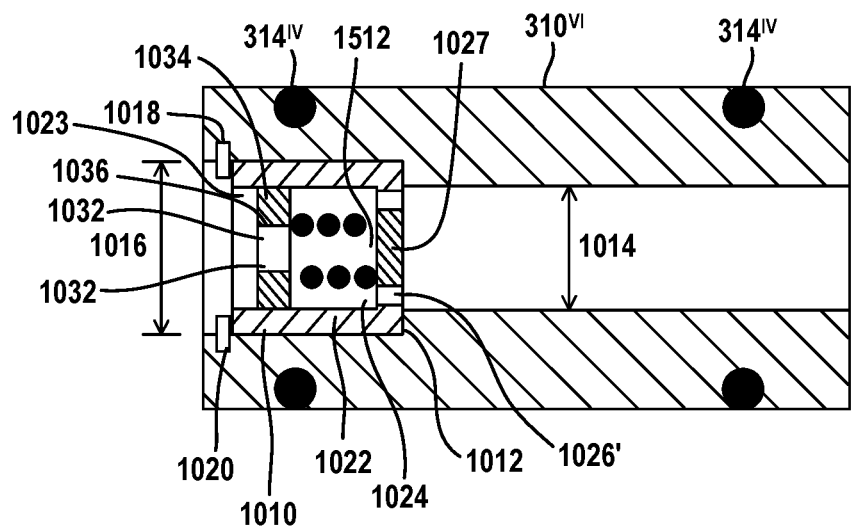
FIG. 15B is a cross-sectional view of the connector of FIG. 15A with more spring compression corresponding to increased fluid pressure from the fluid flowing therethrough.

Referring now to FIGS. 15A and 15B, an alternative example of a connector 310$^{vi}$ is set forth. In this example, the connector 310$^{vi}$ includes an orifice 1026 that is circular or partially circular in nature. In this example, orifice 1026 is located axially outward from the spring 1024. In FIG. 15A the spring 1024 is illustrated in an extended configuration while in FIG. 15B the spring 1024 is partially compressed. When the spring 1024 is fully extended, in FIG. 15A a gap 1510 between the spring coils is provided which is greater than the gap 1512 which is illustrated in FIG. 15B. The combination of the gaps between the coils of the spring constitute an effective area of the connector 310$^{vi}$. Fluid flows through the inlet 1032 (which is within the diameter of the spring) and out the orifice 1026'. The orifice 1026' is outside the diameter of the spring. The path from the inlet 1032 to the orifice 1026' is between the gaps 1510, 1512 between the coils of the spring 1024. The more compressed the spring is, the smaller the gaps and thus the lower amount of fluid. Various spring rates may be used to resist the flow or compression of the springs. In a system, connectors toward the beginning of the flow will have the least amount of spring rate, meaning the compression can be higher. Lower spring rates may be provided at the downstream connectors. Successive connectors downstream may have higher spring rates and thus resist compression more readily. This allows more flow through later connectors.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a multi-element membrane array having a plurality of membrane elements disposed in series;
   a plurality of permeate pipes receiving permeate from a respective one of the plurality of membrane elements, each of the plurality of membrane elements having an inlet and an outlet;
   a plurality of connectors coupling successive permeate pipes of the plurality of permeate pipes together, each of the plurality of connectors comprising one of a plurality of flow restrictors, each of the plurality of flow restrictors sized to restrict permeate flow into a subsequent permeate pipe of the plurality of permeate pipes, an effective area that fluid flows through increases in subsequent connectors of the plurality of connectors;
   each connector of the plurality of connectors comprising a body having a connector inner wall defining a longitudinal passage therethrough, said body comprising an outer wall, an orifice plug within the longitudinal passage, said orifice plug separate from the body; and
   each orifice plug comprising a carrier body having a plug passage therethrough, each carrier body comprising an orifice plate comprising an orifice, an inlet disposed within the plug passage and a spring disposed within the carrier body resisting movement of the orifice plate, whereby movement of the orifice plate changes an amount of fluid flowing through each connector of the plurality of connectors, each spring in subsequent connectors of the plurality of connectors provides a reduced amount of spring force for resisting movement of the orifice plate.

2. The system as recited in claim 1 wherein the effective area corresponds to the area between coils of the spring.

3. The system as recited in claim 1 wherein the effective area varies depending on a position of the orifice plate.

4. The system as recited in claim 1 wherein longitudinal flow of fluid changes the position of the orifice plate and compresses the spring.

5. The system as recited in claim 1 wherein the orifice is disposed outside a diameter of the spring and the inlet is disposed within the diameter of the spring.

6. The system as recited in claim 1 wherein each connector of the plurality of connectors has an effective internal diameter such that subsequent connectors of the plurality of connectors comprise larger effective internal diameters.

7. The system as recited in claim 1 wherein the plurality of flow restrictors cause net driving pressures of subsequent membrane elements of the plurality of membrane elements to increase over the multi-element membrane array.

8. The system as recited in claim 1 wherein a plurality of flow restrictors cause subsequent membrane elements of the plurality of membrane elements to produce substantially a same amount of permeate over the multi-element membrane array.

9. The system as recited in claim 1 wherein each connector of the plurality of connectors comprises a connector outer wall that comprises a shoulder extending inward therefrom, said shoulder defining a shoulder diameter.

10. The system as recited in claim 9 wherein the orifice plug engages the shoulder.

11. The system as recited in claim 10 wherein the shoulders in subsequent connectors of the plurality of connectors have successively larger opening diameters.

* * * * *